US006539112B1

(12) United States Patent
Smith

(10) Patent No.: US 6,539,112 B1
(45) Date of Patent: Mar. 25, 2003

(54) METHODS AND SYSTEM FOR IDENTIFYING A REFERENCE REGION ON AN IMAGE OF A DROPPED-OUT FORM

(75) Inventor: Brent R. Smith, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

(21) Appl. No.: 09/514,671

(22) Filed: Feb. 28, 2000

Related U.S. Application Data

(60) Provisional application No. 60/121,747, filed on Feb. 26, 1999.

(51) Int. Cl.$^7$ .................................................. G06K 9/00
(52) U.S. Cl. ...................................... 382/181; 382/182
(58) Field of Search .............................. 382/179, 180, 382/181, 182, 183, 163, 166, 308, 306, 317; 418/500, 521, 441, 607

(56) References Cited

U.S. PATENT DOCUMENTS

| | | | |
|---|---|---|---|
| 4,741,045 A | | 4/1988 | Denning .......................... 382/9 |
| 5,016,040 A | * | 5/1991 | Dwyer, III ...................... 355/20 |
| 5,038,381 A | | 8/1991 | Nelson ............................ 382/9 |
| 5,321,768 A | | 6/1994 | Fenrich et al. .................. 382/9 |
| 5,542,007 A | * | 7/1996 | Chevion et al. ............. 382/232 |
| 5,579,408 A | * | 11/1996 | Sakaguchi et al. ........... 382/187 |
| 5,623,558 A | | 4/1997 | Billawala et al. ............ 382/254 |
| 5,657,395 A | | 8/1997 | Hirota .......................... 382/163 |
| 5,680,479 A | | 10/1997 | Wang et al. ................. 382/176 |
| 5,694,494 A | | 12/1997 | Hart et al. .................... 382/305 |
| 5,790,711 A | | 8/1998 | Murakami ................... 382/267 |
| 5,889,887 A | | 3/1999 | Yabuki et al. ............... 382/178 |
| 5,896,464 A | | 4/1999 | Horiuchi et al. ............. 382/178 |
| 5,943,443 A | * | 8/1999 | Itonori et al. ................ 382/225 |
| 6,005,976 A | | 12/1999 | Naoi et al. ................... 382/202 |
| 6,021,221 A | | 2/2000 | Takaha ......................... 382/199 |

OTHER PUBLICATIONS

*Cartouche User's Manual*, Version 1.4©, 1993–1997 RAF Technology, Inc.

* cited by examiner

*Primary Examiner*—Andrew W. Johns
*Assistant Examiner*—Seyed Azarian
(74) *Attorney, Agent, or Firm*—Stoel Rives LLP

(57) ABSTRACT

This invention relates to the field of optical character recognition for data in drop-out forms. In the absence of permanent, fixed landmarks, this invention uses the structure of the entered data to provide a landmark to be used in solving various problems encountered in automated processing of drop-out forms. An expected data pattern is located in a scanned image and compared to a defined data pattern in a template form that serves as a reference.

15 Claims, 5 Drawing Sheets

HICKS, RONALD

RT 7 BOX 4898      10

MEXIA      TX 76667      817-555-2454

HICKS, RONALD
RT 7 BOX 4898

MEXIA                              TX
76667                    817-555-2454

FIG. 1

HICKS,RONALD

RT 7 BOX 4898

MEXIA                              TX 76667            817-555-2454

FIG. 2

Score=30

Score=65

Score=80

METHODS AND SYSTEM FOR IDENTIFYING A REFERENCE REGION ON AN IMAGE OF A DROPPED-OUT FORM

RELATED APPLICATION

This application claims the benefit of U.S. provisional patent application No. 60/121,747 filed Feb. 26, 1999.

TECHNICAL FIELD

This invention relates to the field of automated processing of drop-out forms for use with optical character recognition technology.

BACKGROUND OF THE INVENTION

Automated forms processing is possible because data that has been entered into a form is highly structured. The physical location of data and the structure of data, once located, are well specified. As used throughout this specification and the attached claims, the term "data" refers to any information entered into a form, whether numbers, text, initials, logos, shaded areas, or any other sort of marking entered into the form.

Unfortunately, scanned images can be rotated, stretched, offset, or skewed. Thus, in order to successfully read a form, software must be able to correct for any of these image transformations. By finding landmarks on the image and comparing them with the expected locations of these landmarks as exemplified by a template form, the mapping from image coordinates to template form coordinates can be determined. These landmarks are called registration points and the process of finding the image-to-template coordinate transformation is called registration.

One of the difficulties of using optical character recognition (OCR) technology to automatically read data on a form is that the form itself will often occlude the data. This happens when someone filling out the forms does not properly provide the desired data within the boundaries provided on the form. If a box on a form is intended to hold data, but the person filling out the form writes too large to fit inside the box, then the lines of the box itself will strike through or obscure a portion of the data. The same results occur if data is being typed or printed into a form and the data does not fall cleanly within the boundaries of the box.

To avoid occluding data, forms can be printed in drop-out ink (usually red or blue) that the scanner can filter out to leave only data in the scanned image. However, when a form is printed entirely of drop-out ink, all of the known landmarks are lost at the time of scanning. This leads to what is known as the drop-out form registration point location problem, which refers to the difficulties inherent in locating registration points in the absence of fixed landmarks on the form.

In the case of a mixed stream of image types, the processing system must identify the particular form with which each image is associated. For standard (non-drop-out) forms, this is a relatively simple task because the form is included in each image, and the form will contain landmarks to identify the form type. However, in the case of drop-out forms, where the original form is filtered out of the digital image, the lack of known landmarks makes the problem of form identification vastly more complicated. This is what is referred to as the drop-out form identification problem.

The drop-out form identification and registration point selection problems are only two common examples of the problems encountered when processing forms that provide no fixed landmarks. Another problem is encountered when a form is being processed only to perform OCR on one particular type of data entry. If that particular data entry cannot be located, processing becomes impossible. Existing OCR systems do not provide a convenient, reliable, or efficient automated process to solve any of these problems. Solving these and other problems associated with automated drop-out form processing is the subject of the present invention.

SUMMARY OF THE INVENTION

This invention uses the patterns and structure of the actual data entered into the form to provide an identification region for use in processing the form. As used in this specification and the attached claims, the phrase "identification region" refers to an area in the digital image of a dropped-out form that corresponds to a pre-defined area on a template form. As used in this specification and the attached claims, the phrase "template form" refers to a digital image of the drop-out form that serves as a standardized reference against which later images may be compared. Also, as used in this specification and the attached claims, the pre-defined area on the template form, to which the identification regions correlates, is referred to as a "reference region."

Once identified, the data within the identification region may be used to identify the particular form from among a mixed stream of forms, provide a registration point for use in registering the image, or solve other types of problems encountered when processing drop-out forms that lack fixed landmarks. The steps in this invention may be configured by the user to function on any form type or mixed stream of form types.

The first step in implementing this invention is to set up the template form. During the set-up phase, the user locates and defines the boundaries of a region on the form in which the entered data ideally will have a distinctive and predictable pattern. This region on the template form is the reference region, and the corresponding region on the scanned image is called the identification region.

As used in this specification and the attached claims, the term "pattern" refers to the formation, shape, or structure represented by the data. One example of a data pattern would be that found in an address section of a filled-out form that uses a standard address format. The first horizontal line typically represents a name; the second line represents a street address; finally, there is a line for a city, state, and zip code. The type of data pattern selected will depend on the particular form and the information requested in the form. For example, a medical insurance claim form may have data fields for patient name, insurance carrier, and policy number. The size, number, distribution, and position relative to one another of data fields such as these define a particular data pattern. As used throughout this specification and in the attached claims, the term "defined data pattern" refers to the data pattern defined in a template form within the reference region, and the term "expected data pattern" refers to the data pattern found within the identification region in the digital image of a form. The expected data pattern corresponds to the defined data pattern.

As used in this specification and the attached claims, the term "distinctive" describes a data pattern that is dissimilar to other data patterns on the same form, thus reducing the probability of mistaking another data pattern for the expected data pattern. Also, as used in this specification and in the attached claims, the term "predictable" describes a data pattern that is expected to be present on substantially all forms that are filled out and possess a fairly standard and constant structure. Because the ink comprising a drop-out form is filtered out during scanning, the data field must be filled out, or there will be nothing to use in identifying the form, locating registration points, or performing other form processing procedures.

If part of the automated drop-out form processing requires identification of the form, then the defined data pattern should also be unique to one particular type of form. As used in this specification and in the attached claims, the term "unique" describes a data pattern that is at a particular location on only one type of form. Because someone using this invention selects the data pattern such that there is a one-to-one correspondence between the type of form and the particular location of the data pattern, verifying that the data pattern exists at that location verifies the identity of the form. If form identification is not required (for example, if only one type of form is being processed, or if distinguishing the type of form is not necessary), then the selected data pattern does not have to be unique.

To delineate the defined data pattern, the user divides the reference region into sub-regions where data (i.e., dark matter) is expected and sub-regions where no data (i.e., white space) is expected. A sub-region is referred to as a "dark zone" if data is expected or a "white zone" if no data is expected. The characteristics of the dark zones and white zones, including their size, number, distribution, and position relative to each other, essentially create the defined data pattern. This defined data pattern acts as a fingerprint of the data expected to be in a form within the reference region. Applying this fingerprint to the identification region on the image of a form, and identifying entered data that matches this fingerprint within the identification region, identifies the location of the expected data pattern in that form. Identifying and knowing the location of the expected data pattern is what allows the form to be processed.

To implement this invention, the identification region and the dark and white zones are used both to locate the expected data pattern and to calculate an associated confidence level. One method of locating the expected data pattern is by generating a weighted pixel count on each of the dark zones and white zones within the identification region. For example, a pixel within a dark zone can have a weight of 1, and a pixel within a white zone can have a weight of −1. It is not necessary to use positive and negative values, but values should be selected so as to obtain a most favorable score when the data is in the dark zones where it is expected.

For a particular location of the dark zones and white zones, a score is calculated. The invention uses a sequence of searching steps to maximize this scoring function over a search domain. The search domain is defined by the enclosing boundaries of the identification region. One example of a sequence of searching steps would be to select an initial location for the dark and white zones within the search domain, and then, while keeping the position of the dark and white zones fixed with respect to one another, translating the entire set of dark and white zones to a new location within the search domain. As used in this specification and the attached claims, the term "translate" means to move within the space represented by the search domain, without turning or rotating the item being moved. The movement during translation is relative, so translating the defined data pattern with respect to the digital image data achieves the same result as translating the digital image data with respect to the defined data pattern.

A weighted pixel count is calculated for each location of the set of dark and white zones until a maximum weighted pixel count has been identified. Once found, the location of the maximum weighted pixel count gives the location of the expected data pattern within the identification region. Knowing the location of the expected data pattern provides the location of a registration point, and hence a solution to the problem of drop-out form registration point location.

The value of the maximum weighted pixel count may be compared to a predetermined reference value to calculate a final confidence level. Some examples of a predetermined reference value include an average weighted pixel count, a minimal acceptable weighted pixel count, a maximum allowable weighted pixel count, or any other suitable reference value. The final confidence level quantifies the degree to which the user is certain the expected data pattern was actually located. If the user chose the defined data pattern to be unique, the expected data pattern will only be at that particular location on one form, so a high final confidence level at that location will only be achieved for that particular form. Hence, the drop-out form identification problem is also solved.

Additional objects and advantages of this invention will be apparent from the following detailed description of preferred embodiments thereof which proceeds with reference to the accompanying drawings.

BRIEF DESCRIPTION OF THE DRAWINGS

FIG. 1 represents a typical page containing data in a pattern.

FIG. 2 represents a scanned image of the page of FIG. 1, wherein the data pattern illustrates image transformation in the scanned image.

FIG. 10C represents the location of the dark zone that obtains the maximum weighted pixel count.

DETAILED DESCRIPTION OF A PREFERRED EMBODIMENT

This invention relates to the field of optical character recognition on data in drop-out forms. This invention allows for automated forms processing even when the processed image contains no permanent, fixed landmarks. Automated forms processing is possible because data that has been entered into a form is highly structured. This invention allows the user to locate an expected data pattern within a scanned image and compare it to a defined data pattern on a template form. These comparisons are often made difficult by the fact that scanned images can experience rotation, stretching, offsetting, skewing, or other image transformations. With reference to FIG. 1 and FIG. 2, FIG. 1 represents an original data pattern 10 and FIG. 2 represents a scanned data pattern 12. The scanned data pattern 12 depicts data transformed from the original structure of the original data pattern 10. This invention uses the data itself in the scanned data pattern 12 and compares it to the original data pattern 10 to determine how to correct for any image transformations that occurred during scanning.

Figure 3:
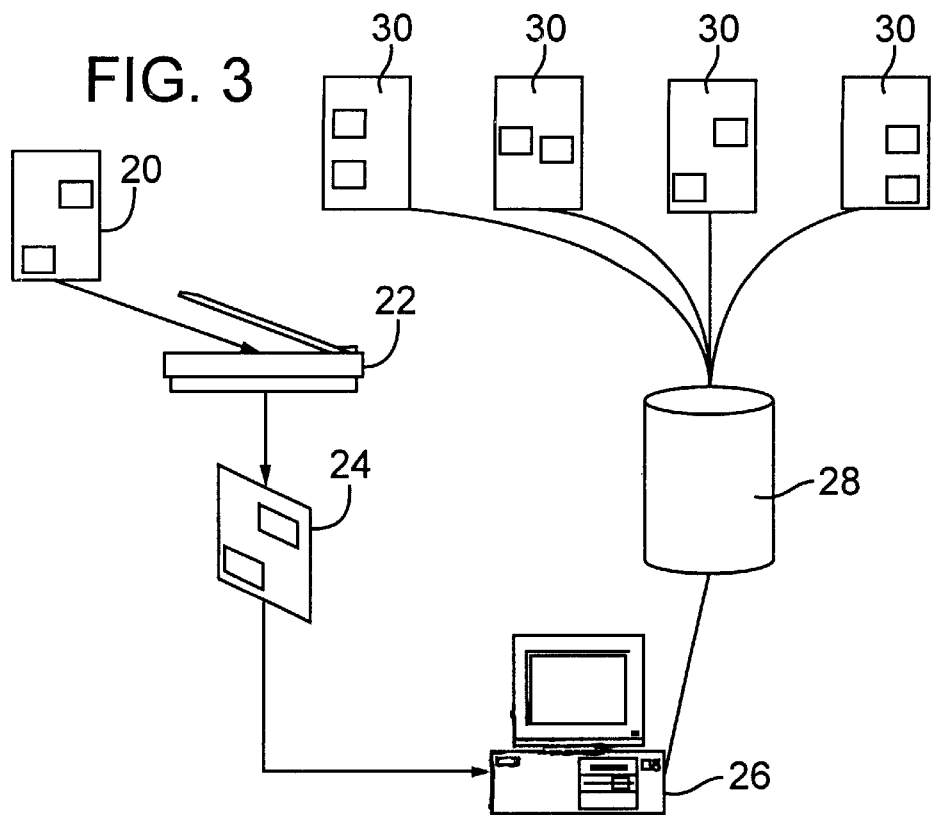
FIG. 3 illustrates a schematic overview of the overall system.

FIG. 3 depicts the overall system of the invention. With reference to FIG. 3, the user scans an original page 20 with a scanner 22. The original page 20 has a form printed in drop-out ink (usually a red or blue color that the scanner 22 can filter out). The drop-out form on the original page 20 also has entered data. The scanner 22 produces a scanned image 24 that has image transformations with respect to the original page 20. The scanned image 24 can then be processed by a computer and computer program 26 that allow automated forms processing. The computer and computer program 26 have access to a database 28, and the database 28 contains plurality of template forms 30. The computer and computer program 26 compare the scanned image 24 to each of the template forms 30, one at a time, to determine which template form 30 the scanned image 24 best fits. This is an example of drop-out forms processing to allow identification of a scanned image 24. Drop-out form identification is only one potential use for this invention, as the invention applies to a much broader spectrum of drop-out form processing problems. FIG. 3 represents an overall schematic of a preferred embodiment of the system making up the invention. Other elements may be added without departing from the nature or purpose of the invention. Similarly, some elements may not be necessary to practice this invention.

Figure 4:
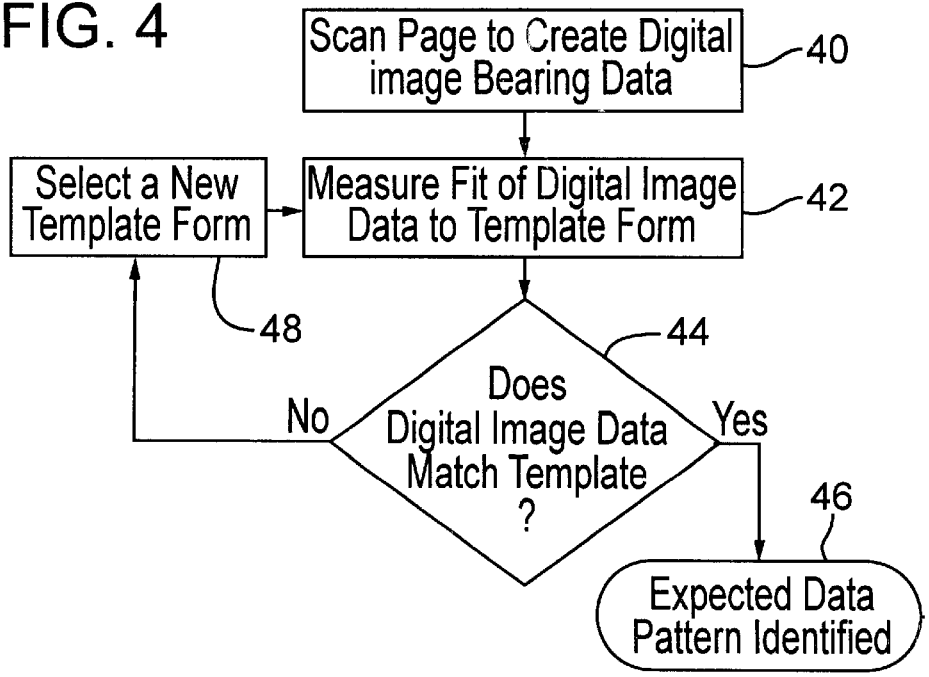
FIG. 4 is a flow diagram overview of the process of identifying an expected data pattern.

FIG. 4 depicts a flow chart showing the process of matching data in a scanned image to a particular template. The flow chart begins with a scanning step 40 in which a page is scanned to create a digital image bearing data. At this point, the drop-out form has been filtered out and only the data remains. The next step is the measuring step 42 in which the digital image data is measured to determine how well it fits an initial template form. Next is a comparison step 44 in which the fit of the digital image to the template form is compared to a reference fit value. In a preferred embodiment of this invention, the comparison step is achieved by allowing the user to predetermine a reference fit value based on the data expected. A user can define a minimal reference fit value below which it can be said that the scanned image does not correspond to the template being tested. However, other types of reference fit values could also be used. For example, a maximum reference fit value could be used, or an average reference fit value could be used. Any reference fit value is acceptable so long as it enables the comparison step 44 to be conducted. Once the comparison step 44 is conducted, if the comparisons show that the digital image data matches the template being tested, then an end determination 46 is made that the expected data pattern had been identified. If the comparison step 44 yields an unfavorable result, and the digital image data being tested did not match the template, and the invention proceeds to a iterative step 48, in which a new template form is selected and the measuring step 42 and comparison step 44 are once again conducted. The iterative step 48 continues until the end determination 46 is achieved.

This invention operates by first setting up a template form to serve as a reference against which scanned images are later compared. In a preferred embodiment, the template form is obtained as a digital image with minimal scanning noise or distortion. In a preferred embodiment, the template form already has the drop-out form filtered out, but it contains representative data to allow the user to define a data pattern to compare against scanned images. A preferred embodiment of this invention also uses Group III Compressed Tiff files for the images. Other image file formats could also be used. Also, a preferred embodiment implements Document Attribute Format Specification as a preferred standard for optical character recognition and document image decomposition data.

Figure 5:
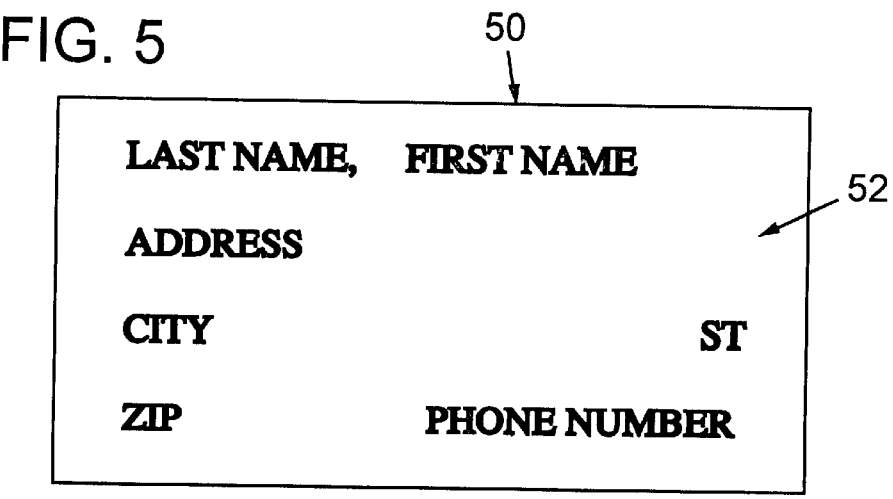
FIG. 5 depicts a reference region that encloses a portion of a template form containing data with a distinctive and predictable pattern.

During the set up phase, the user first locates a region of the template form in which the data will have a distinctive and predictable pattern. In a preferred embodiment, an address section of the form would represent such a distinct and predictable pattern. However, other patterns could also be used. Another example would include information entered in a medical form, such as an insurance carrier, a policy member, and a policy expiration date. This invention allows the user to select the data that would be used as a reference in the user-defined data pattern. With reference to FIG. 5, the user defines a boundary representing a reference region 50 around a defined data pattern 52. In this illustration of a preferred embodiment, the defined data pattern 52 encompasses generic data that represents entered data in a filled-out form. As used in this specification and the attached claims, the term "fille-out form" refers to a form in which some data has been entered. A form does not have to have all possible data fields completed to be a "filled-out form."

Figure 6:
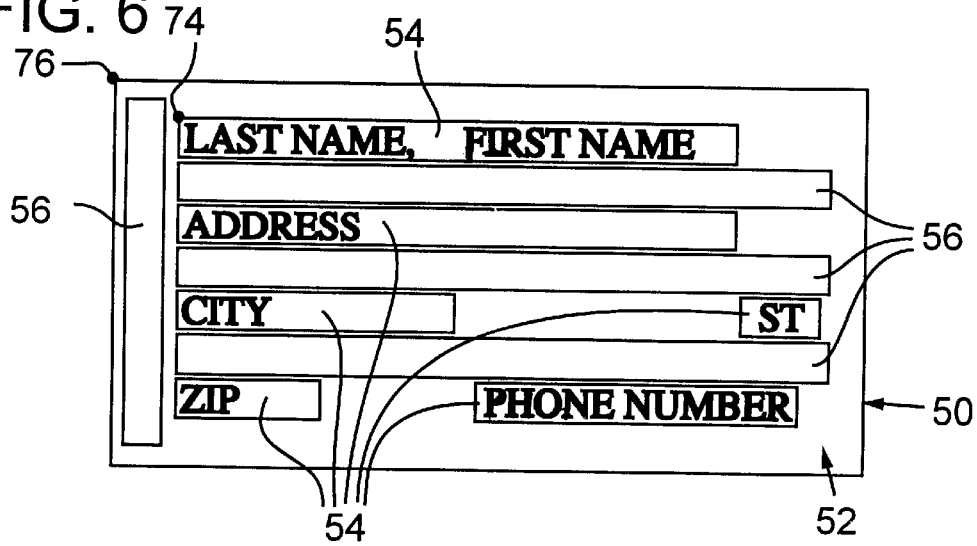
FIG. 6 further illustrates the subdivision of the reference region of FIG. 5 into dark zones where data is expected to be present, and white zones where no data is expected to be present, in order to define a data pattern.

In the next step, the user divides the reference region 50 into subregions. These subregions are called dark zones 54, if they are expected to include data, and white zones 56, if they are expected to include white space on a filled-out form. FIG. 6 illustrates the dark zones 54 and white zones 56 inside the reference region 50. Together these dark zones 54 and white zones 56 make up the defined data pattern 52. This defined data pattern 52 is inside the reference region 50 and the reference region 50 is in the digital template form.

Figure 7:
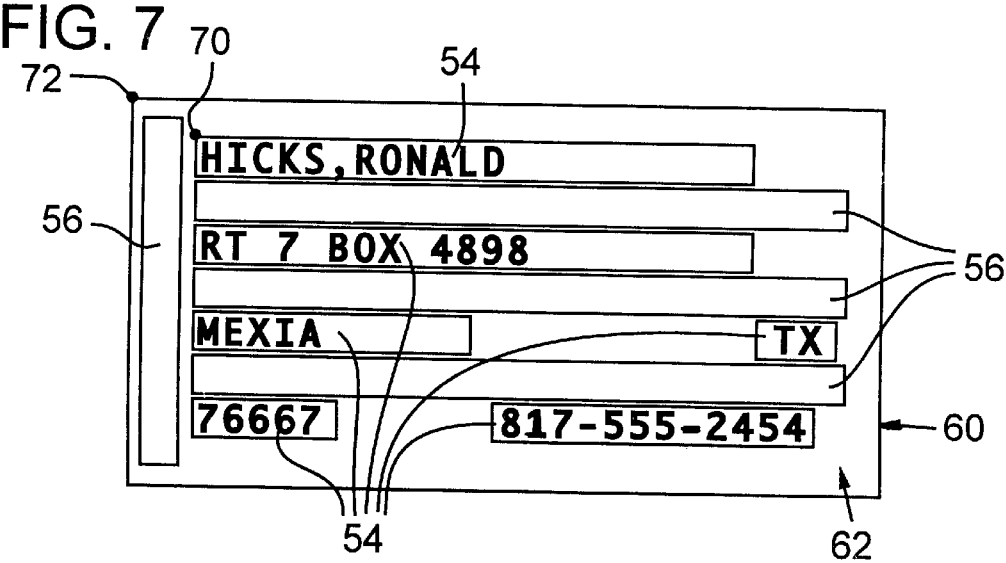
FIG. 7 represents an expected data pattern in a drop-out that fits the dark zones and white zones defining the defined data pattern of FIG. 6.

With reference to FIG. 7 this invention delineates an identification region 60 in the scanned image of a page bearing a drop-out form that has been completed with data. The identification region 60 of FIG. 7 corresponds to the reference region 50 of FIGS. 5 and 6. Again with reference to FIG. 7, the dark zones 54 and white zones 56, which make up the defined data pattern 52 of FIGS. 5 and 6, are applied to the identification zone 60 to locate an expected data pattern 62. FIG. 7 represents the situation in which the digital image data of the expected data pattern 62 fits inside the dark zones 54 and the white zones 56 enclose only white space. This is the desired end result. However to achieve this result, the invention must often search within the identification region 60 to find the best fit of the expected data pattern 62 to the dark zones 54 and white zones 56.

Figure 8A:
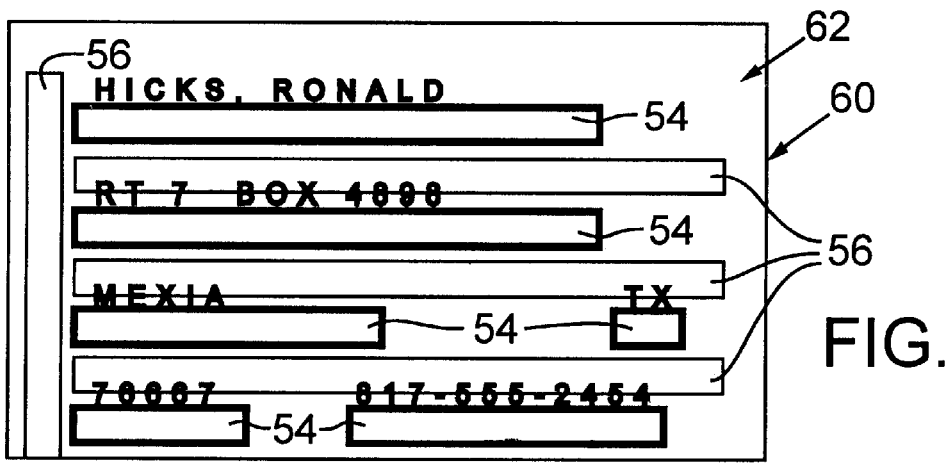
FIGS. 8A–8C depict a translation of the dark zones and white zones making up the defined data pattern to identify the location of the expected data pattern that achieves the best fit to the dark zones and white zones.
Figure 8B:
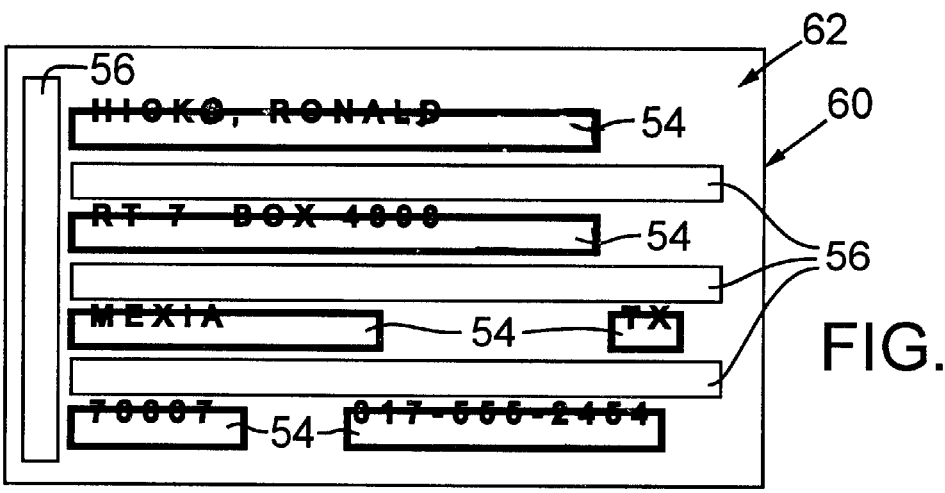
Figure 8C:
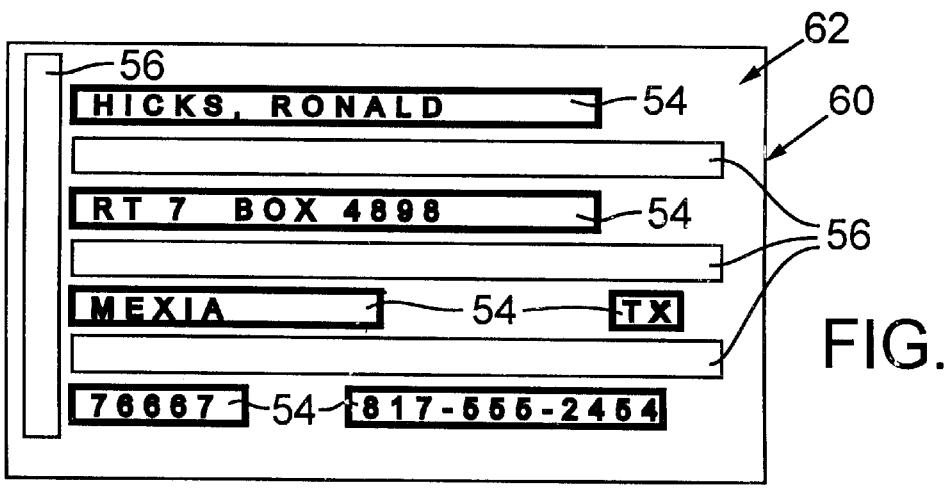

FIGS. 8A through 8C represent a search of the identification region 60 to find the best fit of the expected data pattern 62 to the dark zones 54 and white zones 56. FIG. 8A depicts a situation in which none of the data in the expected data pattern 62 is within a dark zones 54. Conversely, the data is partially present in the white zones 56. In FIG. 8B the dark zones 54 and white zones 56 have be translated, as a solid unit, vertically toward the top of the identification region 60. In this new location, approximately half of the data comprising the expected data pattern 62 is located in the dark zones 54 and none of the data is located in the white zones 56. Accordingly, FIG. 8B represents a better fit of the expected data pattern 62 to the dark zones 54 and white zones 56 than FIG. 8A. FIG. 8C depicts the best fit of the expected data pattern 62 to the dark zones 54 and white zones 56. All of the data in the expected data pattern 62 is located inside the dark zones 54 where it is to be expected.

Figure 9:
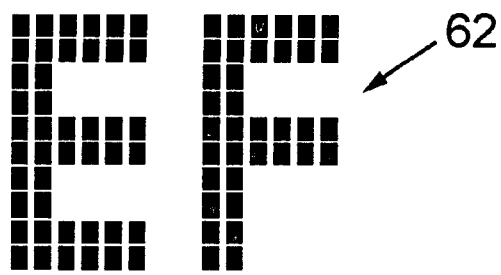
FIG. 9 represents the individual pixels comprising two characters of an expected data pattern to be found within a dark zone.
Figure 10A:
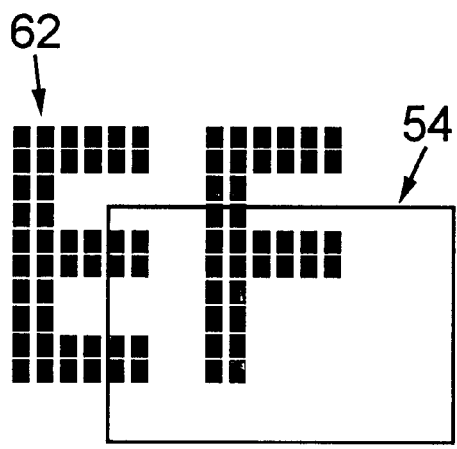
FIGS. 10A–10C represent a search procedure to achieve a best fit of the expected data pattern, quantified as a maximum weighted pixel count within a dark zone.
Figure 10B:
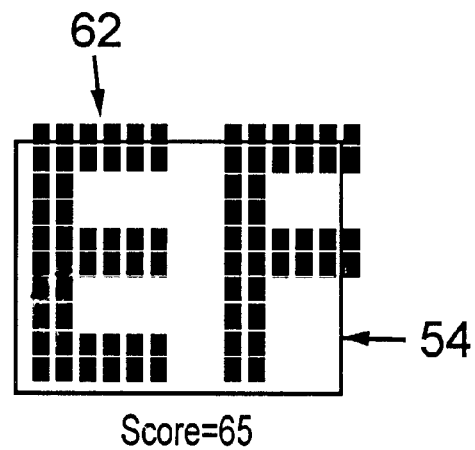
Figure 10C:
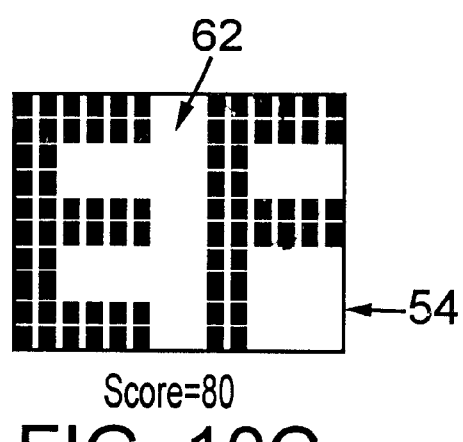

Although there are various ways to determine the fit of the expected data pattern 62, a preferred embodiment of this invention uses a weighted pixel count. FIG. 9 and FIGS. 10A through 10C depict a simplified version of a weighted pixel count fit being determined. FIG. 9 represents the expected data pattern 62 comprising two letters totaling 80 individual pixels. In actuality, the pixels are contiguous; however, in FIG. 9, the pixels have been illustrated with spaces between them for conceptual clarity. In FIG. 10A, the initial location of the dark zone 54 encloses 30 pixels of the expected data pattern 62. A weighted pixel count can be determined by assigning a first value to pixels located in a dark zone, and a second value to pixels located in a white zone. A preferred embodiment gives a score of plus one to pixels in a dark zone and negative one to pixels in a white zone. Although FIGS. 10A through 10C do not depict a white zone 56, each pixel inside the dark zone 54 obtains a score of positive one. Accordingly, in FIG. 10A, the 30 pixels inside the dark zone 54 obtain a score of 30. In FIG. 10B, 65 pixels are inside the dark zone 54 at the second location, and a score of 65 is obtained. Finally, in FIG. 10C all 80 pixels of the expected data pattern 62 are inside the dark zone 54 at the third location. Because a score of 80 represents the maximum score of all the locations tested, FIG. 10C represents the location of the expected data pattern 62.

Again with reference to FIG. 7, once the expected data pattern 62 has been located by determining the best fit of the digital image data within the dark zones 54 and white zones 56. The invention uses the location of the expected data pattern 62 to solve the problems faced in automated processing of drop-out forms. Although there are many problems facing automated processing of drop off forms, this description of a preferred embodiment of the invention will address two in particular. These two are the drop-out form identification problem, and the drop-out form registration point location problem. Once the location of the expected data pattern 62 is known, the user also has a registration point 70 available. In FIG. 7, the registration point 70 is defined as the top left corner of the top dark zone 56. The user can then measure the distance between registration point 70 and a fixed point such as the corner point 72 of the identification region 60. With reference to FIGS. 6 and 7, because the identification region 60 corresponds to the reference region 50, the corner point 72 on the identification region 60 corresponds to the corner point 76 on the reference region 50. A user can then measure the distance between the corner point 76 on the reference region 50, and the original registration point location 74 in the reference region 50. By comparing the difference in distance between the corner point 76 in the reference region 50 and the original registration point location 74 in the reference region 50 to the difference in distance between the corner point 72 in the identification region 60 and the registration point 70 in the identification region 60, the user can determine the degree to which the image underwent transformation during the scanning process. Hence, the problem of drop-out form registration point location has been solved.

Using the weighted pixel average calculated by determining the best fit of the expected data pattern 62 to the dark zones 54 and white zones 56, a final confidence level can be calculated. This final confidence level quantifies the degree to which a user can be certain that the expected data pattern 62 was truly located. In a preferred embodiment of this invention, the user predefines a minimum value, below which it can be said there is zero confidence the expected data pattern 62 was found. Alternatively, a maximum value can be set, or an expected average value could be used. In addition to the minimum confidence value, a preferred embodiment of this invention also uses a maximum expected confidence value above which it can be said that there is complete confidence the expected data pattern 62 was found. The maximum and minimum values define the slope of a line. Confidence values in between the minimum value and maximum value can be interpreted by linear interpolation (a process well know to those skilled in the art). If the defined data pattern 52 was defined to be unique to one particular type of form, then a high confidence level at that location of the expected data pattern can only occur for one type of form. Accordingly, if a high confidence level is achieved, the form has been identified. This provides a solution to the drop-out form identification problem.

In order to allow automated drop-out forms processing to occur in a more efficient and effective manner, a preferred embodiment of this invention uses some specific optimization procedures to search for the best fit of the digital image data to the defined data pattern. While an exhaustive search of all possible translations of the defined data pattern would have the benefit of guaranteeing that the best fit has been found, it would operate far too slow to be an effective procedure. Accordingly, some straight-forward, but effective, optimizations can be made. One important feature of the digital image data is its general size or spatial frequency. Borrowing concepts from the "Nyquist Sampling Theorem, " one could translate the translating entity in increments of one half the spatial frequency, and then fine-tune the placement of the entity by translations amounting to an exhaustive search only in the neighborhood of the best point on the "Nyquist Grid." The user configuring the search area will know what type of data to expect and can set properties that specify the horizontal and vertical spatial frequencies. When the search procedure is operating, the invention does an initial search over the grid of points whose separation is determined by these properties. Then, an exhaustive search will be performed in the four quadrants bordering the best grid point.

Given this method, an optimal grid spacing can be computed based on the size of the search area. To simplify the computations, it can be assumed that the horizontal and vertical spatial frequencies are equal. If the area being searched has a width "W," a height "H," and a grid spacing "s," then the number "N" of positions the search procedure will try, using the method just described, is approximated by the following equation:

$$N = \frac{W}{s} * \frac{H}{s} + 4s^2$$

A value of s is desired that minimizes N. Calculus determines that a minimum number N occurs when:

$$s = \sqrt[4]{\frac{1}{4}WH}$$

This value of s should be used only if it is smaller than one half the spatial frequency of the expected data pattern. In practice, this a priori optimal grid size is often acceptable. This results in a search procedure that operates in a time quantity:
very strong horizontal nature. This affords another extreme optimization. Due to the strong horizontal nature, virtually any vertical path in the search area will result in a best y-value that is very close to the actual optimal y-position. A subsequent horizontal sweep at that y-value will result in a point (x,y) that is very close to the optimal pint. Finally, an exhaustive search in the neighborhood of this point can be performed to find the optimal registration point location. In a preferred embodiment, each of these sweeps can use a 1-dimensional grid technique analogous to the 2-dimensional grid technique described above. This results in a search procedure that operates in a time quantity:

$$o(\sqrt{W}+\sqrt{H})$$

A preferred embodiment of this invention can implement further optimizations with respect to the determination of a confidence level. One preferred range of confidence values is between 0 (no confidence) and 255 (highest confidence). Once the search procedure has located a best fit, which occurs when the defined digital image data falls within the dark zones of the defined data pattern, it must then convert the fit to a confidence value between 0 and 255. Due to the wide variety of applications of this procedure, there is no a priori way of associating a confidence value with a best fit, such as that determined by a raw pixel count. Thus, some user-defined properties are used. The confidence level is a function of two things: 1) the maximum pixel count, and 2) the ratio of the maximum score to the total number of black pixels contained in the identification region. The confidence level measures not only a raw score, but also the percentage of pixels in the identification region that are present in the desired location.

The user defines the following values: a "minimum" score, a "plenty" score, a "mini pixel fraction," and a "plenty pixel fraction." If "M" is the maximum score, and "D" is the number of black pixels in the identification region, then the confidence level, "C," is defined as follows:

$$C=255*S*R$$

where
  S=0 if M<or=the minimum score;
  S=1 if M>or=the plenty score; and
  S=(M—minimum score)/(plenty score—minimum score) otherwise
and
  R=0 if M/D<or=minimum pixel fraction;
  R=1 if M/D>or=plenty pixel fraction; and
  R=(M/D—minimum pixel fraction)/(plenty pixel fraction—minimum pixel fraction) otherwise.

Thus, S grows linearly with M from a value of 0 when M is the minimum score, to a value of 1 when M is the plenty score. Similarly, R grows linearly with M/D from a value of 0 when the ratio is the minimum pixel fraction, to a value of 1 when the ratio is the plenty pixel fraction It will be obvious to those having skill in the art that many changes may be made to the details of the above-described embodiment of this invention without departing from the underlying principles thereof. The scope of the present invention should, therefore, be determined only by the following claims.

What is claimed is:

1. A method of identifying an expected data pattern for use in facilitating automated drop-out forms processing, the expected data pattern being in a digital image of a page, the digital image being created by scanning the page, and the page bearing data arranged in a predetermined configuration generally conforming to a dropped-out form represented by a digital template form, the method comprising the steps of:
   obtaining the digital template form;
   defining, in the digital template form, a reference region having a boundary;
   identifying, within the reference region boundary, first areas where data is expected to be present, and second areas where no data is expected to be present, so as to define a defined data pattern;
   obtaining the digital image of the page bearing data, the dropped-out form being dropped out of the digital image;
   comparing the defined data pattern to the digital image data at an initial location within an identification region in the digital image, the identification region corresponding to the reference region in the template form;
   determining a fit of the defined data pattern to the digital image data at the initial location; and
   repeatedly translating the defined data pattern relative to the digital image data, and redetermining the fit, until a location is identified that provides a best fit of the defined data pattern to the digital image data.

2. The method of claim 1, wherein the step of repeatedly translating the defined data pattern translates the defined data pattern within the identification region.

3. The method of claim 2, wherein the step of repeatedly translating the defined data pattern includes:
   dividing the identification region into a grid having predefined spacing; and
   translating the defined data pattern to each grid point in the grid.

4. The method of claim 1, wherein the step of determining a fit includes:
   counting digital image data pixels within the first areas and the second areas;
   assigning a first value to the digital image data pixels within the first areas and a second value, different from the first value, to digital image data pixels within the second areas;
   calculating a total of first values and a total of second values; and
   calculating a total value for the defined data pattern by combining the total of first values and the total of second values.

5. A method of identifying an expected data pattern for use in facilitating automated drop-out forms processing by allowing identification of a dropped-out form, the expected data pattern being in a digital image of a page, the digital image being created by scanning the page, and the page bearing data arranged in a predetermined configuration generally conforming to the dropped-out form represented by a digital template form, the method comprising the steps of:
   obtaining the digital template form;
   defining, in the digital template form, a reference region having a boundary;
   identifying, within the reference region boundary, first areas where data is expected to be present, and second areas where no data is expected to be present, so as to define a defined data pattern;
   obtaining the digital image of the page bearing data substantially conforming to the dropped-out form, the dropped-out form being dropped out of the digital image;
   comparing the defined data pattern to the digital image data at an initial location within an identification region in the digital image, the identification region corresponding to the reference region in the template form;
   determining a fit of the defined data pattern to the digital image data at the initial location;
   repeatedly translating the defined data pattern relative to the digital image data, and redetermining the fit, until a location is identified that provides a best fit of the defined data pattern to the digital image data; and determining a final confidence level by comparing the best fit to a predetermined reference fit.

6. The method of claim 5, wherein the defined data pattern is unique to a particular form.

7. The method of claim 5, wherein the step of repeatedly translating the defined data pattern translates the defined data pattern within the identification region.

8. The method of claim 7, wherein the step of repeatedly translating the defined data pattern includes:

dividing the identification region into a grid having predefined spacing; and translating the defined data pattern to each grid point in the grid.

9. The method of claim 5, wherein the step of determining a fit includes:

counting digital image data pixels within the first areas and the second areas;

assigning a first value to the digital image data pixels within the first areas and a second value, different from the first value, to digital image data pixels within the second areas;

calculating a total of first values and a total of second values; and calculating a total value for the defined data pattern by combining the total of first values and the total of second values.

10. A method of identifying an expected data pattern for use in facilitating automated drop-out forms processing by allowing identification of a registration point location, the expected data pattern being in a digital image of a page, the digital image being created by scanning the page, and the page bearing data arranged in a predetermined configuration generally conforming to a dropped-out form represented by a digital template form, the method comprising the steps of:

obtaining the digital template form;

defining, in the digital template form, a reference region having a boundary;

identifying, within the reference region boundary, first areas where data is expected to be present, and second areas where no data is expected to be present, so as to define a defined data pattern;

defining a registration point location with respect to the defined data pattern, the defined data pattern being inside the reference region boundary;

obtaining the digital image of the page bearing data, the dropped-out form being dropped out of the digital image;

comparing the defined data pattern to the digital image data at an initial location within an identification region in the digital image, the identification region corresponding to the reference region in the digital template form;

determining a fit of the defined data pattern to the digital image data at the initial location;

repeatedly translating the defined data pattern relative to the digital image data, and redetermining the fit, until a location is identified that provides a best fit of the defined data pattern to the digital image data; and identifying the registration point location with respect to the expected data pattern, the expected data pattern being at the location where the defined data pattern provides the best fit to the digital image data within the identification region.

11. The method of claim 10, wherein the step of repeatedly translating the defined data pattern translates the defined data pattern within the identification region.

12. The method of claim 11, wherein the step of repeatedly translating the defined data pattern includes:

dividing the identification region into a grid having predefined spacing; and translating the defined data pattern to each grid point in the grid.

13. The method of claim 10, wherein the step of determining a fit includes:

counting digital image data pixels within the first areas and the second areas;

assigning a first value to the digital image data pixels within the first areas and a second value, different from the first value, to digital image data pixels within the second areas;

calculating a total of first values and a total of second values; and calculating a total value for the defined data pattern by combining the total of first values and the total of second values.

14. A method of identifying a drop-out form comprising the steps of:

scanning a page bearing data, whereby the drop-out form is dropped out;

measuring a fit of the data in the scanned image of the page to a first drop-out form template;

comparing the fit to a predefined reference fit;

responsive to a favorable fit comparison, ending the identification process; and responsive to an unfavorable fit comparison, repeatedly selecting a second drop-out form template, measuring a fit to the second drop-out form template, and comparing the new fit to the predefined reference fit until a favorable fit comparison is achieved.

15. A system for automated drop-out forms processing to identify a dropped-out form, comprising:

a scanner for scanning a page bearing data to create a digital image of the page bearing data with the dropped-out form dropped out;

a database containing a plurality of digital template forms, each digital template form representing a particular dropped-out form having a unique data pattern; and a computer program stored on a machine-readable media, the computer program being able to compare the digital image data to, one at a time, the plurality of digital template forms to determine to which particular digital template form the digital image data correlates.

* * * * *